(12) United States Patent
Vittone

(10) Patent No.: US 6,870,119 B2
(45) Date of Patent: Mar. 22, 2005

(54) MODULAR STEEL CONCRETE REINFORCEMENT SYSTEM

(76) Inventor: Domenic Vittone, 2701 S. 224th H-104, Des Moines, WA (US) 98198

( * ) Notice: Subject to any disclaimer, the term of this patent is extended or adjusted under 35 U.S.C. 154(b) by 0 days.

(21) Appl. No.: 10/624,977

(22) Filed: Jul. 21, 2003

(65) Prior Publication Data

US 2004/0056002 A1 Mar. 25, 2004

Related U.S. Application Data

(63) Continuation of application No. 09/823,037, filed on Mar. 29, 2001, now Pat. No. 6,627,832.
(60) Provisional application No. 60/193,408, filed on Mar. 29, 2000.

(51) Int. Cl.$^7$ .............................................. B23K 9/007
(52) U.S. Cl. ...................................... 219/58; 219/137 R
(58) Field of Search .............................. 219/56, 58, 74, 219/125.1, 125.11; 72/169

(56) References Cited

U.S. PATENT DOCUMENTS

| | | | | |
|---|---|---|---|---|
| 2,504,868 A | * | 4/1950 | Muller et al. ................. | 219/74 |
| 3,143,630 A | * | 8/1964 | Sohn et al. ................... | 219/74 |
| 3,364,711 A | * | 1/1968 | Nordgren ..................... | 72/169 |
| 3,370,150 A | * | 2/1968 | Nordgren ..................... | 219/58 |
| 4,221,951 A | | 9/1980 | Connolly | |
| 4,911,209 A | | 3/1990 | Smith et al. | |
| 6,029,880 A | | 2/2000 | Primot | |
| 6,627,832 B2 | * | 9/2003 | Vittone ........................ | 219/58 |

FOREIGN PATENT DOCUMENTS

| | | |
|---|---|---|
| DE | 3324678 A | 1/1985 |
| DE | 29501318 U | 6/1995 |
| JP | 5-169261 * | 7/1993 |

OTHER PUBLICATIONS

Williams, Robert N., Road to Rebar Welding–Marked, but Little Used, Welding Design & Fabrication, Feb. 1980, pp. 67–70.

Kochanowski, J., Effects of Welding on the Properties of Joints Made in reinforcing Steels, Welding International, 1996, pp. 867–870.

* cited by examiner

Primary Examiner—Clifford C. Shaw
(74) Attorney, Agent, or Firm—Black Lowe & Graham PLLC

(57) ABSTRACT

A method of welding reinforcement steel bars (rebar) and assembly of fusion-welded rebar into panel assemblies that are self-stabilizing to withstand the rigors of transport to and positioning within construction sites. The rebar welding method generates fusion welds in such a manner that the weld imparts stability and strength to the welded rebar assemblies. The rebar welds permit the assembling of larger and more varied rebar panel configurations without the need for tie wire or other coupling devices. Further, the welded panels allow positioning of large rebar configurations, insuring that the spacing of the individual bars exceeds all required tolerances. The self-stabilizing fusion rebar welding process allows a more efficient, flexible and rapid method of rebar panel construction by using assembly systems on mobilized trailers or at stationary locations.

15 Claims, 3 Drawing Sheets

MODULAR STEEL CONCRETE REINFORCEMENT SYSTEM

PRIORITY CLAIM

This application is a Continuation of U.S. Ser. No. 09/823,037, filed on Mar. 29, 2001, now U.S. Pat. No. 6,627,832 which claims priority to U.S. Provisional Application Ser. No. 60/193,408, entitled Modular Steel Concrete Reinforcement System, filed Mar. 29, 2000.

All above named applications are incorporated by reference.

FIELD OF THE INVENTION

This invention relates generally to concrete reinforcing steel construction and, more specifically, to the efficient prefabrication and non-structural welding of rebar panels for use in concrete structures. This invention further relates to the fabrication of welded rebar panels on site as well as off site, thereby reducing the cost associated with time, material and labor.

BACKGROUND OF THE INVENTION

Currently, rebar panels are constructed by wire tying, mechanical couplers, and occasionally by a combination of welding and wire tying. All of these processes are costly because they are labor intensive and time consuming. Further, inherent weaknesses within each method limits the size and shape of panel that can be produced, thereby increasing the steps and thus costs in the overall construction process. As a result, conventional reinforcement steel bars (rebar) assembly methods require more steps with increased costs, resulting in the construction of structurally compromised rebar panels.

Tie wire constructed rebar panels often structurally fail for several reasons. Firstly, the connection resulting from the tying process is subject to human inconsistencies. For example, the tie wire connection is only as strong as the individual person making the tie. Thus, structural inconsistencies often exist in panels where more than one person is constructing a panel, or a single person becomes fatigued while doing so.

Even if tied correctly, tied rebar connections severely limit panel size due to wire strength and overall rebar intersection rigidity. Typically, the panels are assembled and tied with the assembly laid out on the ground near the job site. Upon completion of the tying process, a crane or other machine is used to place the panel in the concrete form. Wire tied panels are often incapable of supporting the panel's weight during their placement, often yielding a displacement of the tied rebar members known as "raking." As the spacing of the rebar must be made within the tolerances specified by the engineer, the displaced rebar must be retied in its specified location increasing labor costs.

Not too different from the tied rebar panels are panels constructed with mechanical rebar couplers. Here, a great variety of mechanical couplers are applied to intersections of the rebar panel in place of wire ties. The couplers are more time consuming to use than the wire tie method discussed above. Generally, however, a more consistent rebar connection is attained when using the mechanical coupler over the tie wire panel construction technique. Thus, when the mechanical coupling is done properly a more consistent panel construction is achieved. However, panels constructed with mechanical couplers are very costly with regards to the multiple steps required to assemble them and the price of the couplers themselves.

Finally, attempts have been made to produce a welded rebar panel. Historically, these attempts have yielded a sub-standard product. All prior welding techniques have not achieved metallurgical properties meeting the requirements for reinforced concrete. Rebar in concrete is designed to support tensile loads; therefore, welds must not compromise the ability of the steel to support such loading. Consequently, a rebar panel constructed with welds not having appropriate metallurgical properties is not desirable and may increase the likelihood of a structural failure.

The present invention is directed to a system and method for the construction of weld-stabilized rebar panels that overcomes the above-mentioned problems.

SUMMARY OF THE INVENTION

The present invention comprises a system for the construction of weld-stabilized rebar panels using a plurality of spot fusion welds made by a unique gas metal arc welding (GMAW) process. The system and method includes rapidly welding rebar sections using GMAW to obtain a fusion weld joint. The system includes a rebar shear used to cut the rebar to predetermined lengths, a rebar bender used to impart required curvature to the rebar, a welding jig used to align the rebar in the desired rebar panel configuration, a rebar welder, preferably a gas metal arc welder, a power source, and one or more rolling tables facilitating the movement of the rebar from the rebar shear to the rebar bender and ultimately to the welding jig. In operation, the rebar starts at the rebar shear, where the rebar is cut, as necessary, to predetermined lengths. The rebar then travels along the rolling tables to rebar bender, where any required curvature is imparted to the rebar. The rebar is then forwarded along rolling table to the welding jig, where is comes to a stop aligned within the jig to facilitate intersection with other rebar in the panel assembly. Once the rebar is properly aligned in the welding jig, the rebar welder, powered by the power source, is used to fusion weld the rebar intersections.

Specific settings are used on the welder and the power source in order to achieve a flare bevel groove weld that meets the grade A706 requirements. The use of shielding gas in the method contains not only heat, but also helps create the fusion between the rebar and consumable electrode of the welder without causing any carbon breakdown in the heat-affected zone of the rebar, thus maintaining the rebar ductility and the specific advantages of the present invention.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
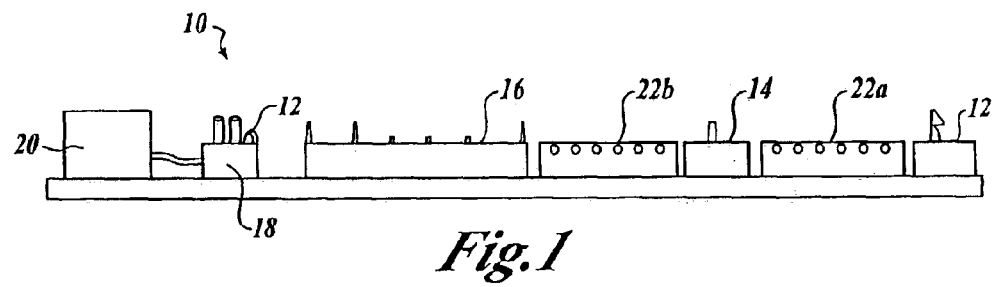
FIG. 1 is a depiction of a welded rebar panel manufacturing center made in accordance with the present invention.

The present invention provides a system and method for construction of weld-stabilized rebar panels. By way of overview and with reference to FIG. 1, the preferred embodiment of the present invention includes a welded rebar manufacturing center 10 including a rebar shear 12 used to cut the rebar to predetermined lengths; a rebar bender 14 used to impart required curvature to the rebar; a welding jig 16 used to align the rebar in the desired rebar panel configuration; a rebar welder 18, preferably a gas metal arc welder (GMAW); a power source 20, such as an 100–185 KW electrical generator (for example, a Lincoln Power Source 400); and one or more rolling tables 22 facilitating the movement of the rebar from the rebar shear to the rebar bender and ultimately to the welding jig. In operation, the rebar starts at rebar shear 12, where the rebar is cut, as necessary, to predetermined lengths. The rebar then travels along rolling table 22a to rebar bender 14, where any required curvature is imparted to the rebar. The rebar is then forwarded along rolling table 22b to welding jig 16, where is comes to a stop aligned within the jig to facilitate intersection with other rebar in the panel assembly. Once the rebar is properly aligned in the welding jig, rebar welder 18, powered by power source 20, is used to fusion weld the rebar intersections, and described with more particularity below.

Figure 2:
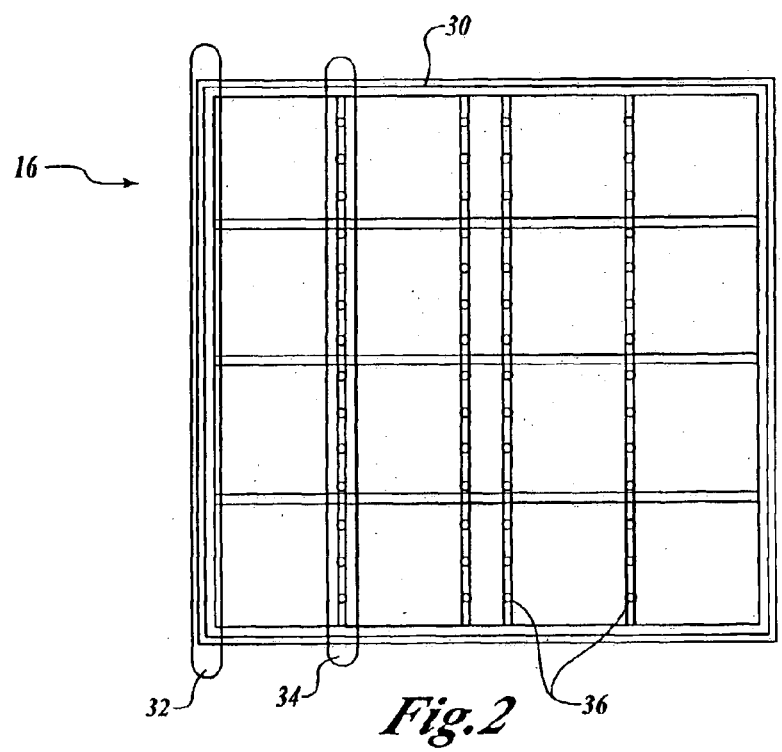
FIG. 2 is a top view of a welding jig made in accordance with the present invention.
Figure 3:
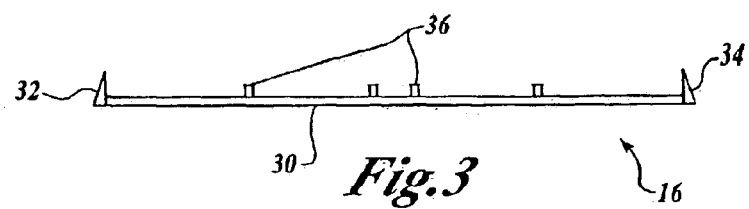
FIG. 3 is a side view of a welding jig of the present invention.

Welding jig 16 is described in more detail with reference to FIGS. 2 and 3. Welding jig 16 includes a frame 30, a base reference spacer 32, an adjustable stop bar 34, and adjustable stopping pins 36 for placing the rebar in the desired spatial relationship to the intersecting rebar. In the preferred operation of this embodiment, a layer of rebar is placed in jig 16 and is held in proper spatial relation to the intersecting rebar via base reference spacer 32 and spacer bar 34. Subsequently, as the adjacent layer of rebar is applied, adjustable stop pins 36 dictate the proper spacing of the rebar.

Critical to the ability of the rebar to function as a tensional load-bearing member is the maintenance of the rebar metallurgical properties. A specific welding process to achieve a flare bevel groove weld of grade A706 must be carried out to ensure that the metallurgical properties of the rebar is not compromised during the fusion weld. After extensive experimentation, its was determined that this welding process is accomplished as follows.

In the preferred embodiment, specific settings are used on welder 18 and power source 20 in order to achieve a flare bevel groove weld that meets the grade A706 requirements. With respect to welder 18, initially the shielding gas supply hose of the welder (not shown) must be disconnected and a flow filter with manual adjustment attached. This results in diffusing the typical narrow flow pattern to a more open spray pattern. The gas flow rate is set to approximately 35 cubic feet per hour. The spot time on the welder is set to approximately 0.02 seconds, and the voltage to approximately 26 volts. A 0.046 inch diameter or equivalent I.E. Muramatic D2-ER80s-D2 electrode wire is fed into the welding area at a feed rate of 350 inches per minute. Additional adjustments are likewise made with respect to power supply 20, preferably an electrical power generator. Specifically, the cover of the electrical generator is removed, after which the main feed cable is removed from the internal breaker. Next, a voltage booster is inserted where the main feed cable was previously attached. Following the insertion of a voltage booster, the main feed cable is attached to the voltage booster in a manner understood by those skilled in the relevant art, or as specifically indicated on the junction plate of a Lincoln Power Source 400. In the preferred embodiment, and as applied using an electrical generator, the selected arrangement is Red=Black, 0=Green, B=White. In this manner, the required voltage (optimally 25-volts) is achieved at an even ratio in order to create the desired weld without affecting the metallurgical properties of the rebar.

In operation of the GMAW rebar welder upon rebar sections in the welding jig, the weld area is flooded with an Argon-Carbon Dioxide shielding gas (approximately 90% Argon, 10% $CO_2$). The Argon/$CO_2$ shielding gas pours at approximately 35 cubic feet per hour (CFH). Filler weld material grade LA90 or Muremantic D2—single shield or dual shield consumable electrode—is placed near the rebar intersection areas. In a preferred embodiment, an arc is struck for two or three seconds, resulting in a molecular fusion weld approximately ¼ to ⅝ inches long. It will be appreciated that longer or shorter welds may also be made. By American Welding Society standard, a flare bevel groove weld is produced. This welding process is repeated at all or a desired subset of rebar intersections of a panel.

The shielding gas contains not only heat, but also helps create the fusion between the rebar and consumable electrode without causing any carbon breakdown in the heat-affected zone of the rebar, thus maintaining the rebar ductility. Based on experimentation, using Argon/$CO_2$ shielding gas with the 90/10% ratio and at approximately 35 CFH flow rate obtains the strongest fusion rebar weld. A rebar panel containing a plurality of such fusion welds is inherently strong and self-stabilizing. Thus, the fusion welded rebar panels do not require any additional stabilizing structure to maintain panel integrity. An independent testing facility was employed to examine the strength value of the weld and to examine the overall effect of the weld on the structural integrity of the rebar. The conclusions reached by researchers at the independent testing facility are presented in Appendix A and incorporated by reference herein.

The present invention anticipates a variety of alternative embodiments of the welded rebar manufacturing center without deviating from the scope of the present invention.

Figure 4:
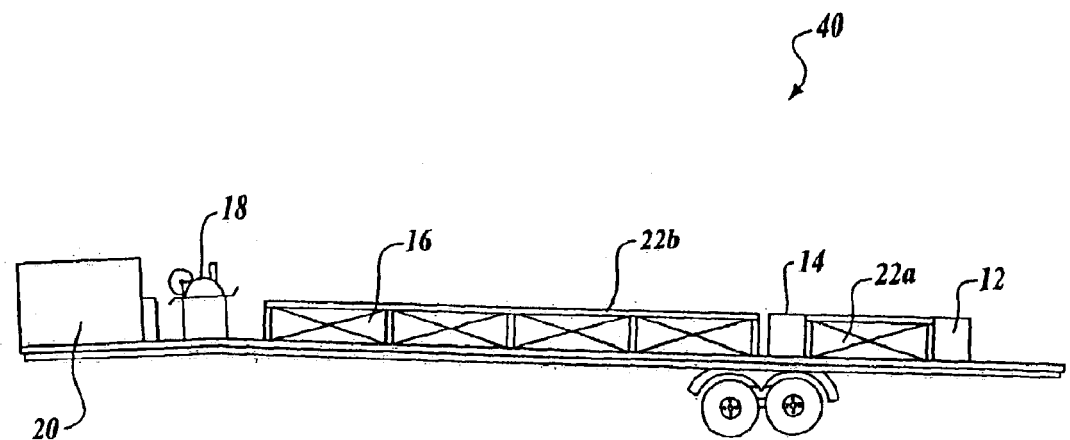
FIG. 4 is a depiction of a portable welded rebar panel manufacturing center made in accordance with the present invention.

FIG. 4 discloses a portable welded rebar panel manufacturing center 40 made in accordance with the present invention. The portable welded rebar panel manufacturing center is mounted on a movable vehicle, such as a trailer, but otherwise includes the same components as described above, namely, rebar shear 12; rebar bender 14; welding jig 16; rebar welder 18; power source 20; and one or more rolling tables 22. The portable manufacturing center is designed to be transported to a construction job site for manufacture of rebar panels of various sizes. This portable version of the invention is especially useful for producing large welded rebar panels that are difficult to transport intact from remote manufacturing facilities using existing technology. In addition, the portable manufacturing center is useful when especially complex panels are required in the construction process.

Figure 5:
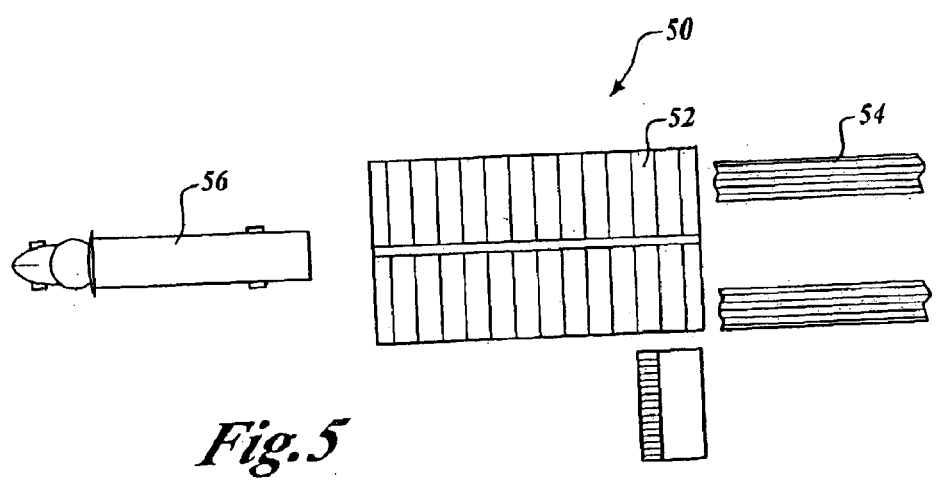
FIG. 5 is a top view of a stationary welded rebar panel manufacturing center made in accordance with the present invention.
Figure 6:
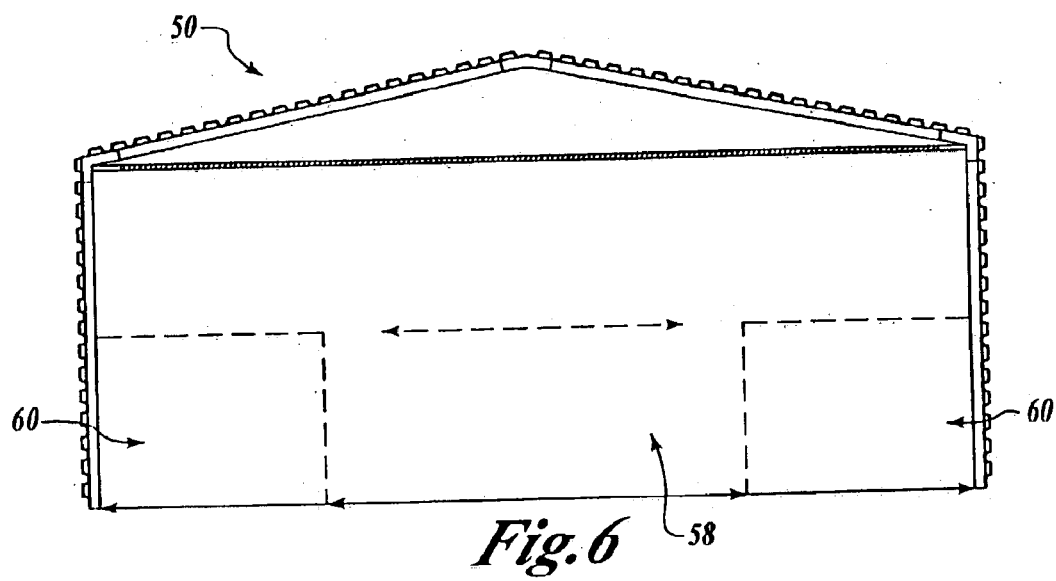
FIG. 6 is a side view of the building component of a stationary welded rebar panel manufacturing center of the present invention.
Figure 7:
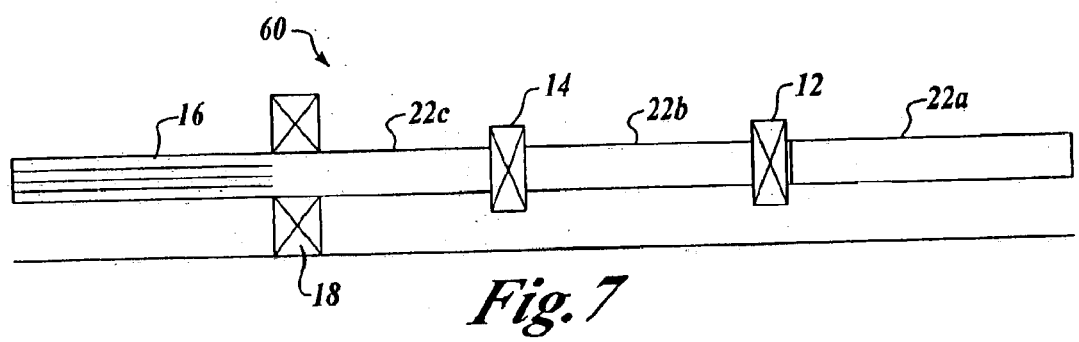
FIG. 7 depicts an alternative embodiment of a welded rebar panel manufacturing center of the present invention.

An alternative embodiment is shown with reference to FIGS. 5–7, which disclose a stationary welded rebar panel manufacturing center 50. FIG. 5 discloses a building 52. At an end of the building is a pile of stock rebar 54—no precut rebar is necessary. Within the building is a welded rebar manufacturing center similar to system described above. Following the same processes disclosed above, welded rebar panels are produced. The welded panels are then placed on a transport vehicle 56 and hauled to the construction site. FIG. 6 discloses a frontal view of the stationary center in which a plurality of welded rebar manufacturing centers 60 are employed. In this manner, the production capabilities of the stationary center is greatly improved. Further, a loading space 58 is maintained between the assembly systems 50 to allow efficient transport of the completed welded panels. The stationary center is generally more useful when employed with smaller welded panels more easily capable of being transported to the construction site from a remote location. FIG. 7 discloses the welded rebar panel manufacturing center having similar components but a slightly different layout in which additional rolling tables are added and the welder is located between the welding jig and the rolling tables.

Figure 8:
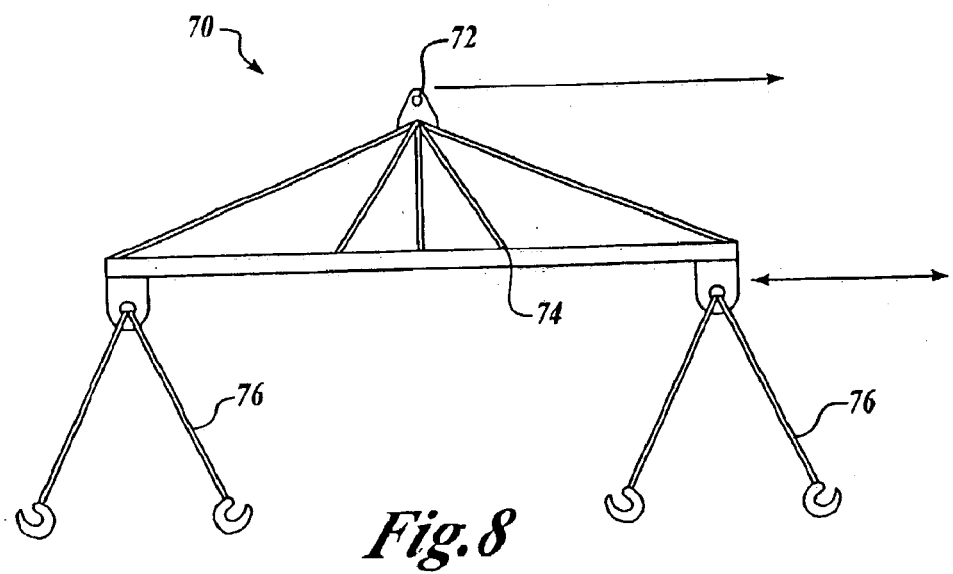
FIG. 8 is a lifting device made in accordance with the present invention.

FIG. 8 is a lifting device 70. The lifting device is used to move completed welded rebar panels from the welded rebar panel assembly control, whether the portable or stationary, to transport vehicle 56, to a the concrete form (not shown), or to a storage pile (not shown). In the preferred embodiment, a cable is attached to a picking eye 72 of the lifting device. The picking eye is also connected to a spreader bar 74, which in turn attaches to evenly spaced cable connectors 76. The cable connectors are attached to the welded rebar panel to facilitate movement of the panels to the desired location.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of rapidly welding rebar sections using gas metal arc welding (GMAW) to obtain a fusion weld joint, comprising:

shearing the rebar sections into lengths appropriate for a construction application;

bending the sheared rebar into shapes appropriate for the construction application;

placing the rebar sections into a welding jig;

positioning the rebar sections to physically touch and intersect at a desired location;

adjusting an electrical power source of the welder within a range of approximately 100 to 185 kilowatts;

positioning a welding rod at a rebar intersection point;

positioning a filler material at the weld location;

delivering a shielding gas to the weld location;

applying electrical power to a welding electrode wire using an electrical power delivery system; and arcing said electrode wire at the intersection point to form a fusion weld joint having a flare bevel groove.

2. The method of claim 1, wherein the rebar is grade A706 steel.

3. The method of claim 1, wherein the filler material is grade ER80S-D2.

4. The method of claim 3, wherein the filler material comprises:

grade LA90; and, grade Murematic D2.

5. The method of claim 1, wherein the shielding gas comprises:

about 90% argon; and, about 10% carbon dioxide.

6. The method of claim 1, wherein the flow rate of the shielding gas is about 35 cubic feet per hour.

7. The method of claim 1, wherein the electrode wire is selected from the group consisting of:

a solid electrode wire of about 0.045 inches diameter single shield; and a flux core electrode wire of about 0.045 inches diameter single shield.

8. The method of claim 7, wherein the electrode wire feed rate is about 350 inches per minute.

9. The method of claim 1, wherein the electrical power is applied to the wire at about 0.02 seconds spot time.

10. The method of claim 1, wherein the combined weld time is about 2–3 seconds.

11. The method of claim 1, wherein the dimension of the fusion weld is about ¼–⅝ inches.

12. The method of claim 1, wherein the fusion weld joint comprises:

a butt joint;

an overlap joint; and a cross joint.

13. A system for producing GMAW fusion welded rebar panels using rebar, comprising:

an assembly system having:

a rebar shear used to cut the rebar into lengths appropriate for a construction application;

a rebar bender used to impart curvature to the rebar appropriate for a construction application;

a welding jig used to align the rebar in the desired rebar panel configuration;

at least one rolling table facilitating the movement of the rebar;

a gas metal arc welding unit; and an electrical power generator delivery system capable of delivering electrical power to the gas metal arc welding unit, wherein the welded rebar panels made by the assembly system comprises at least one fusion weld joint having a flare bevel groove.

14. The system of claim 13, wherein the assembly system is stationary.

15. The system of claim 13, wherein the assembly system is portable.

* * * * *